(12) United States Patent
Sapozhnikov (10) Patent No.: US 9,064,512 B2
(45) Date of Patent: Jun. 23, 2015

(54) METHODS AND DEVICES FOR CONTROLLING ASYMMETRY IN A MAGNETIC READER (75) Inventor: Victor B Sapozhnikov, Minnetonka, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 53 days.

(21) Appl. No.: 13/527,705

(22) Filed: Jun. 20, 2012

(65) Prior Publication Data
US 2013/0003228 A1    Jan. 3, 2013

Related U.S. Application Data (60) Provisional application No. 61/501,883, filed on Jun. 28, 2011.

(51) Int. Cl.
G11B 5/39 (2006.01)
(52) U.S. Cl.
CPC ................... *G11B 5/3906* (2013.01)
(58) Field of Classification Search
CPC ............ G11B 5/39–5/3993; G11B 2005/3996
USPC ........................................................ 360/322
See application file for complete search history.

(56) References Cited

U.S. PATENT DOCUMENTS

| | | | | |
|---|---|---|---|---|
| 5,027,243 | A | * | 6/1991 | Gill et al. ...................... 360/315 |
| 5,216,560 | A | * | 6/1993 | Brug et al. ..................... 360/322 |
| 5,270,892 | A | * | 12/1993 | Naberhuis ...................... 360/322 |
| 5,296,987 | A | * | 3/1994 | Anthony et al. ............... 360/322 |
| 5,420,736 | A | * | 5/1995 | Heim et al. .................... 360/322 |
| 5,905,611 | A | * | 5/1999 | Yoda et al. ................. 360/324.1 |
| 7,027,268 | B1 | * | 4/2006 | Zhu et al. ...................... 360/314 |
| 2005/0280952 | A1 | * | 12/2005 | Kondo et al. .................. 360/322 |
| 2007/0152254 | A1 | * | 7/2007 | Lai et al. ....................... 257/295 |

* cited by examiner

Primary Examiner — Craig A. Renner
(74) Attorney, Agent, or Firm — Braden Katterheinrich (57) ABSTRACT In certain embodiments, an apparatus includes a magnetoresistive (MR) sensor having a first and second electrode positioned at a first side of the MR sensor and a third electrode positioned at a second side of the MR sensor opposite the first side. In certain embodiments, an apparatus includes first and second electrodes coupled to an MR sensor and positioned at a first side of the MR sensor. The first and second electrodes are spaced apart from each other and are positioned over an area of the MR sensor that has a positive or negative asymmetry.

19 Claims, 10 Drawing Sheets

METHODS AND DEVICES FOR CONTROLLING ASYMMETRY IN A MAGNETIC READER

RELATED APPLICATIONS

The present application is related to U.S. provisional patent application Ser. No. 61/501,883 filed on Jun. 28, 2011, entitled "METHODS AND DEVICES FOR CONTROLLING ASYMMETRY IN A MAGNETIC READER" from which priority is claimed under 35 U.S.C. §119(e) and which application is incorporated by reference herein in its entirety.

SUMMARY

Various embodiments of the present invention are generally directed to devices for controlling asymmetry in a magnetic reader.

In certain embodiments, an apparatus includes a magnetoresistive (MR) sensor having first and second electrodes positioned at a first side of the MR sensor and a third electrode positioned at a second side of the MR sensor opposite the first side.

BRIEF DESCRIPTION OF THE DRAWINGS

FIG. 4 provides a top view of a portion of an example magnetic reader, in accordance with various embodiments of the present disclosure FIG. 5 provides a side view of the portion of the magnetic reader of FIG. 4.

FIG. 6 provides a side view of the portion of the magnetic reader of FIG. 5.

DETAILED DESCRIPTION

A magnetic recording head typically includes a reader portion having a magnetoresistive (MR) sensor for retrieving magnetically encoded information stored on a magnetic disc. During operation, MR sensor performance can be degraded by design and manufacturing issues that cause the MR sensor to become unbalanced, resulting in unbalanced current through the MR sensor. However, these issues can be compensated for. For example, MR sensors contain areas of positive and negative asymmetry, which results in MR sensors' asymmetry varying along the MR sensor. This unbalanced asymmetry in combination with electrode positioning along the MR sensor can be used to compensate for design and manufacturing issues. Accordingly, the present application discloses multiple methods and devices for controlling asymmetry by positioning and configuring an electrode and/or sets of electrodes at or near sides of an MR sensor, thereby controlling and balancing current through the MR sensor. The present application also discloses multiple methods and devices that permit tuning the asymmetry for individual readers after the readers have been manufactured, thereby controlling and balancing current through each individual, manufactured reader.

Figure 1:
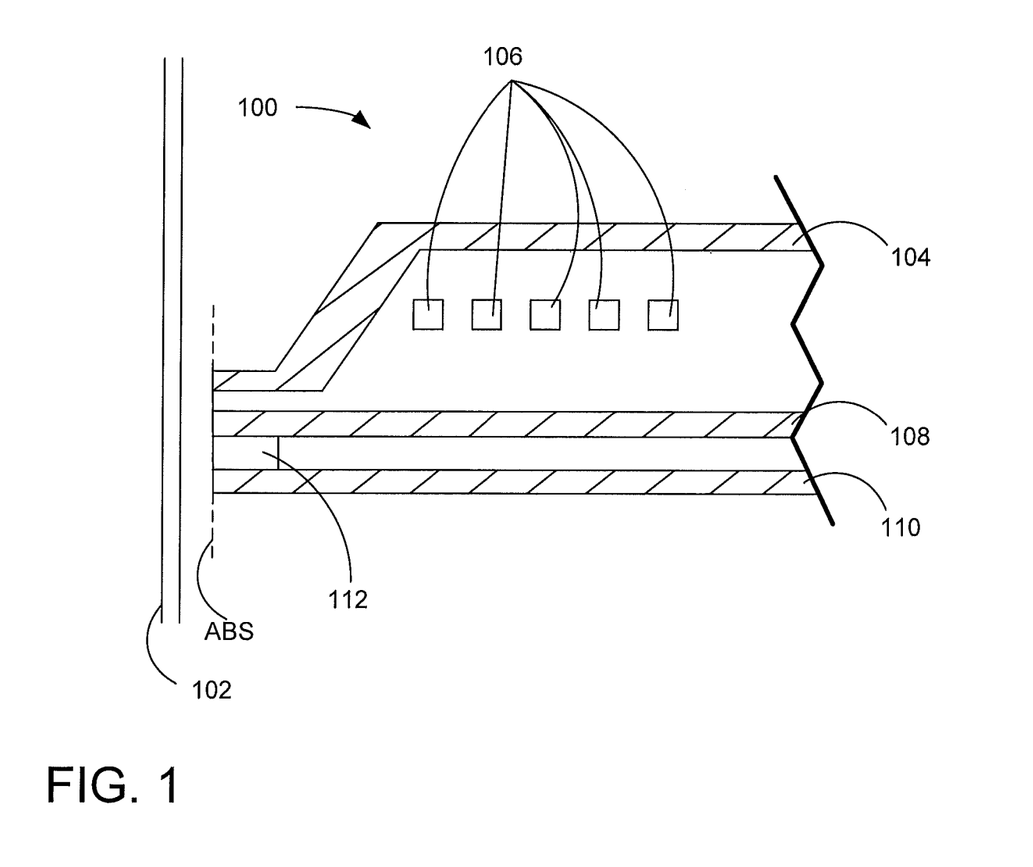
FIG. 1 provides a side view of an example magnetic read/write head and a magnetic disc, in accordance with various embodiments of the present disclosure.

FIG. 1 is a side view of an example magnetic read/write head 100 and a magnetic disc 102. The head 100 includes a top pole 104, coils 106, bottom pole/top shield 108, bottom shield 110, and MR stack or sensor 112. FIG. 1 illustrates the location of magnetically significant elements of the magnetic read/write head 100 of the present disclosure as they appear along the air bearing surface (ABS) of the magnetic read/write head 100. For example, in FIG. 1, all spacing and insulating layers of the magnetic read/write head 100 are omitted for clarity.

The bottom pole/top shield 108 and bottom shield 110 are spaced to provide for a location for the MR stack 112. A sense current is caused to flow through the MR stack 112 via electrodes (not shown) between bottom pole/top shield 108 and the MR stack 112 and between the bottom shield 110 and MR stack 112. As the sense current is passed through the MR stack 112, a reader portion of the magnetic read/write head 100 exhibits a resistive response, which results in a varied output voltage. The sense current flows perpendicular to the plane of the MR stack 112. The magnetic read/write head 100 is merely illustrative and other configurations may be used in accordance with the present invention.

Figure 2:
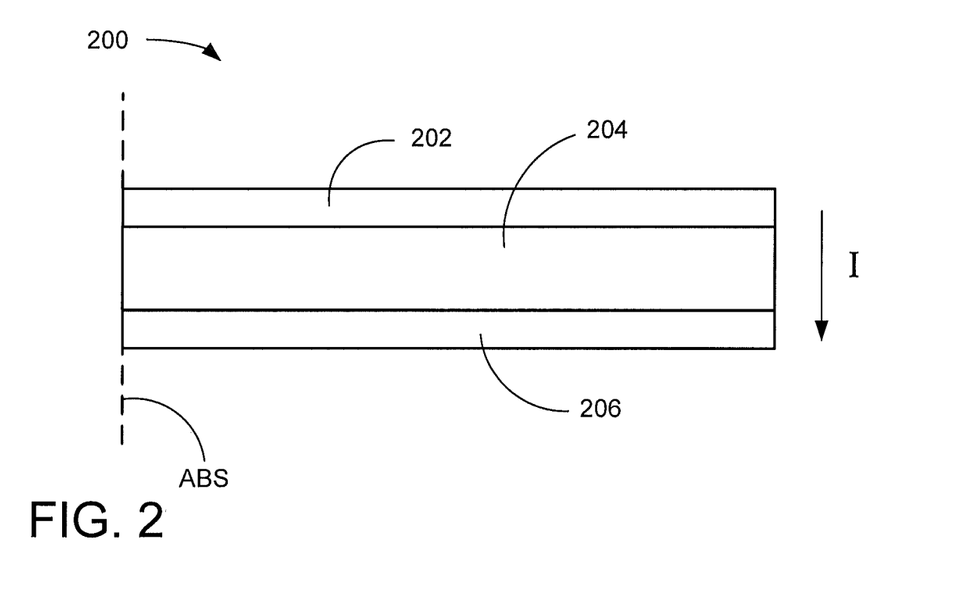
FIG. 2 provides a side view of an example MR stack, in accordance with various embodiments of the present disclosure FIG. 3 provides a top view of the MR stack of FIG. 2.

FIG. 2 provides a side view of an example MR stack 200 having a first free layer 202, non-magnetic layer 204, and second free layer 206. This particular configuration of an MR stack is commonly referred to as a trilayer reader. Current (I) flows perpendicularly to the plane of layers 202-206 of the MR stack 200 and experiences a resistance that is proportional to the cosine of an angle formed between the magnetization directions of the first free layer 202 and second free layer 206. The voltage across the MR stack 200 is then measured to determine the change in resistance and the resulting signal is used to recover encoded information from a magnetic recording medium. It should be noted that the trilayer MR stack 200 configuration is merely illustrative and other layer configurations for the MR stack 200 may be used in accordance with certain embodiments the present disclosure. For example, the MR stack 200 could also include various spacing and insulating layers, but these additional layers are omitted for clarity. In certain embodiments, the free layers 202 and 206 have a high resistance along the free layers 202 and 206 in a direction perpendicular to the ABS and a low resistance parallel to the ABS, thereby facilitating current channeling perpendicular to the ABS through desired areas of the MR stack 200.

Figure 3:
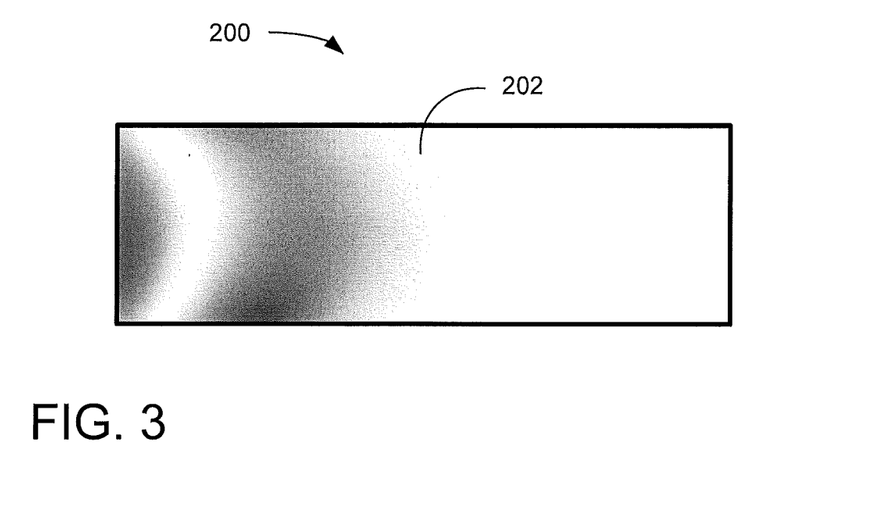

FIG. 3 shows a top view of the MR stack 200. The shaded regions of the MR stack 200 represent positive and/or negative asymmetry. This unbalanced asymmetry in combination with electrode positioning along an MR stack, as shown in FIGS. 4-6, can be used to compensate for design and manufacturing issues.

Figures 4, 5, 6:
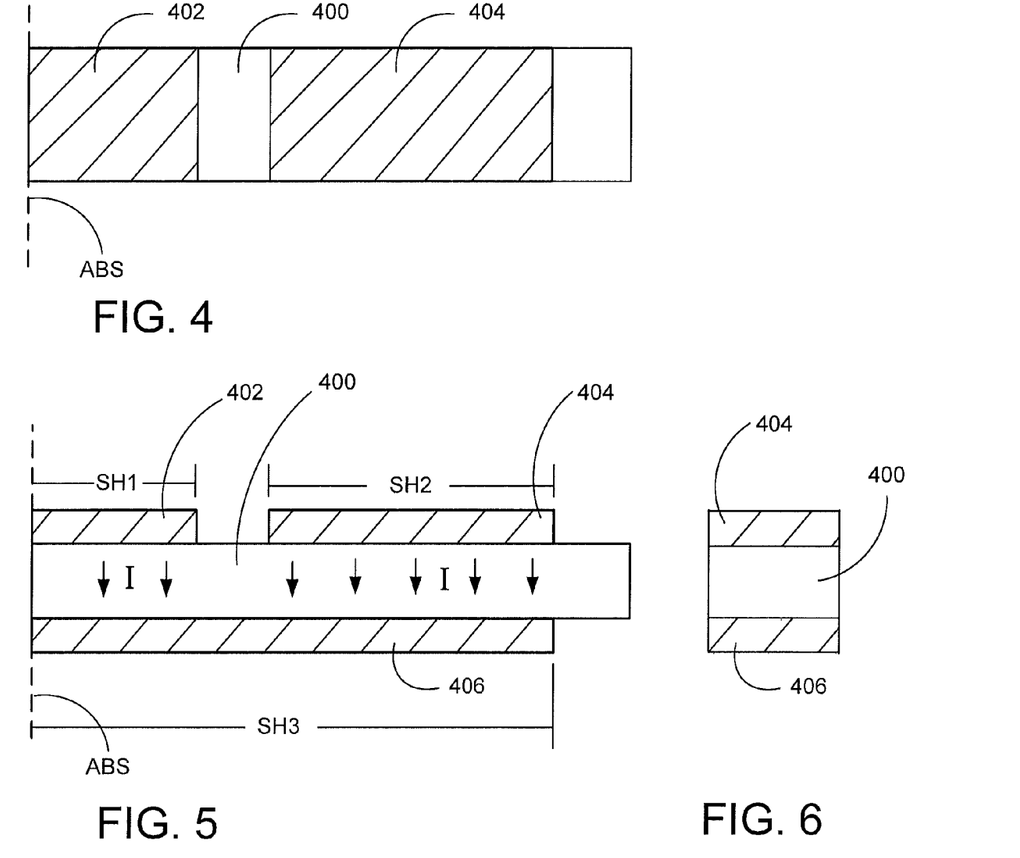

FIGS. 4-6 provide an example configuration to tune an MR stack's asymmetry. FIGS. 4-6 show an MR stack 400, first electrode 402, second electrode 404, and third electrode 406. Each electrode 402, 404, and 406 has a corresponding length or stripe height SH1, SH2, and SH3. The first and second electrodes 402 and 404 are positioned at a first side of the MR stack 400 and the third electrode 406 is positioned at a second side of the MR stack 400 opposite the first side, where SH1+SH2<SH3.

FIGS. 4-6 only provide the basic layers of the configuration; for example, the first, second, and third electrodes 402, 404, and 406 are not necessarily connected directly to the MR stack 400 because various layers—like spacing and insulating layers—may be positioned between the electrodes 402-406 and MR stack 400.

The electrodes 402-406 are positioned to control current (I) traveling through the MR stack 400. For example, the first and second electrodes 402 and 404 can be positioned directly above areas of the MR stack 400 with negative or positive asymmetry (this configuration is specifically shown in FIG. 7). This positioning allows for the control of the amount of current to channel through certain areas of the MR stack 400; thereby balancing the MR stack 400. For example, for a given position of the electrodes 402-406, the fraction of current run through the electrodes can be varied, thereby "tuning" the asymmetry for an individual reader. Each electrode's stripe height (SH) can vary depending on the specific application.

Figure 7:
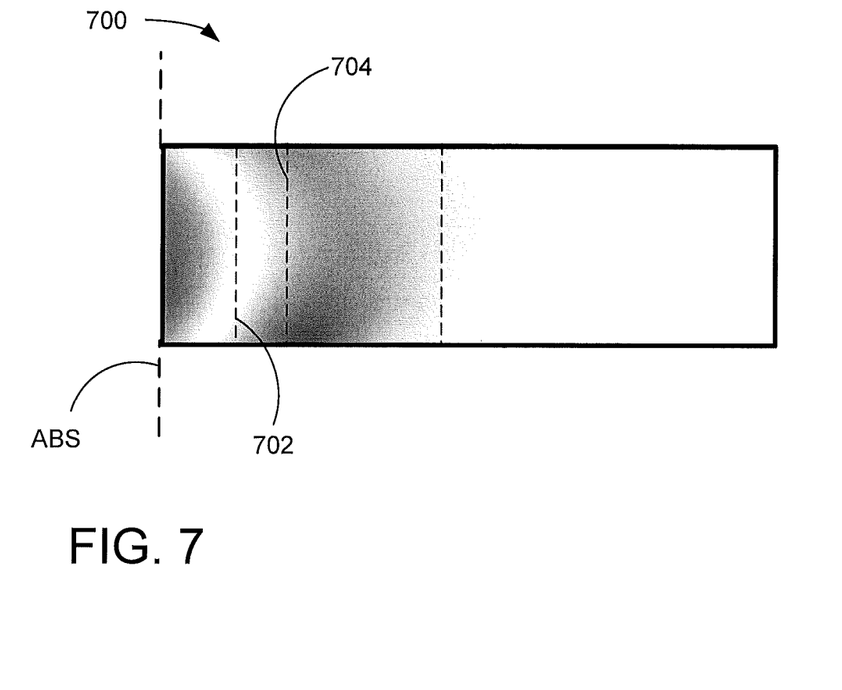
FIG. 7 provides a top view of an example MR stack, in accordance with various embodiments of the present disclosure.

FIG. 7 provides a top view of an MR stack 700 with boundaries of the first and second electrodes 702 and 704 represented by dotted lines. The shaded regions of the MR stack 700 represent positive and/or negative asymmetry. For example, the shaded region closest to the ABS can have a negative asymmetry that gradually increases in asymmetry until reaching 0 and further increasing to reach a positive asymmetry, which eventually reduces in asymmetry back to zero along the length of the MR stack 700 away from the ABS. This unbalanced asymmetry in combination with electrode positioning along the MR stack 700 can be used to compensate for design and manufacturing issues. For example, positioning the first and second electrodes 702 and 704 above areas of the MR stack 700 with negative or positive asymmetry allows for the control of the amount of current to channel through certain areas of the MR stack 700; thereby balancing the MR stack 700.

Figure 8:
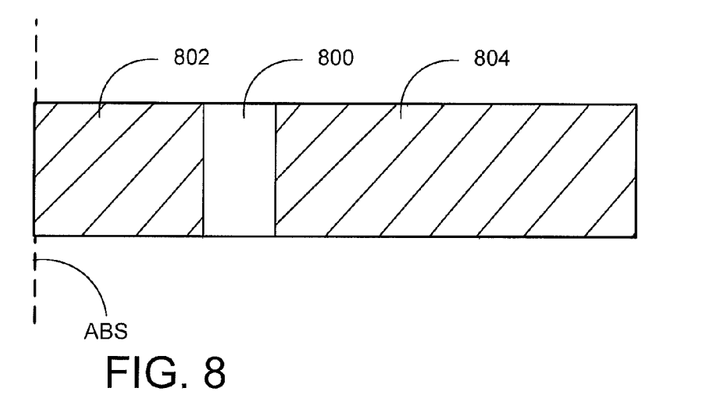
FIG. 8 provides a top view of a portion of an example magnetic reader, in accordance with various embodiments of the present disclosure FIG. 9 provides a side view of the portion of the magnetic reader of FIG. 8.
Figure 9:
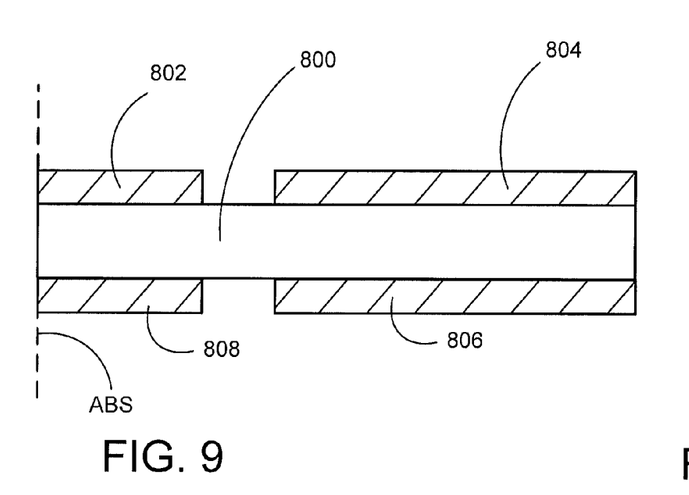
Figure 10:
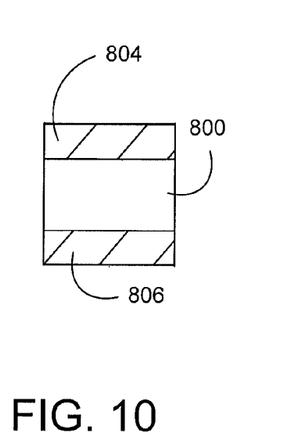
FIG. 10 provides a side view of the portion of the magnetic reader of FIG. 9.

FIGS. 8-10 show an MR stack 800, first electrode 802, second electrode 804, third electrode 806, and fourth electrode 808. The first and second electrodes 802 and 804 are positioned at a first side of the MR stack 800 and the third electrode 806 and fourth electrode 808 are positioned at a second side of the MR stack 800 opposite the first side, where 802 and 804 are spaced from each other and 806 and 808 are spaced from each other.

FIGS. 8-10 provide the basic layers of the configuration; for example, the first, second, third, and fourth electrodes 802, 804, 806, and 808 are not necessarily connected directly to the MR stack 800 because various layers may be positioned between the electrodes 802-808 and MR stack 800. The electrodes 802-808 are positioned to control current traveling through the MR stack 800. Each electrode's stripe height can vary depending on the specific application.

Figure 11:
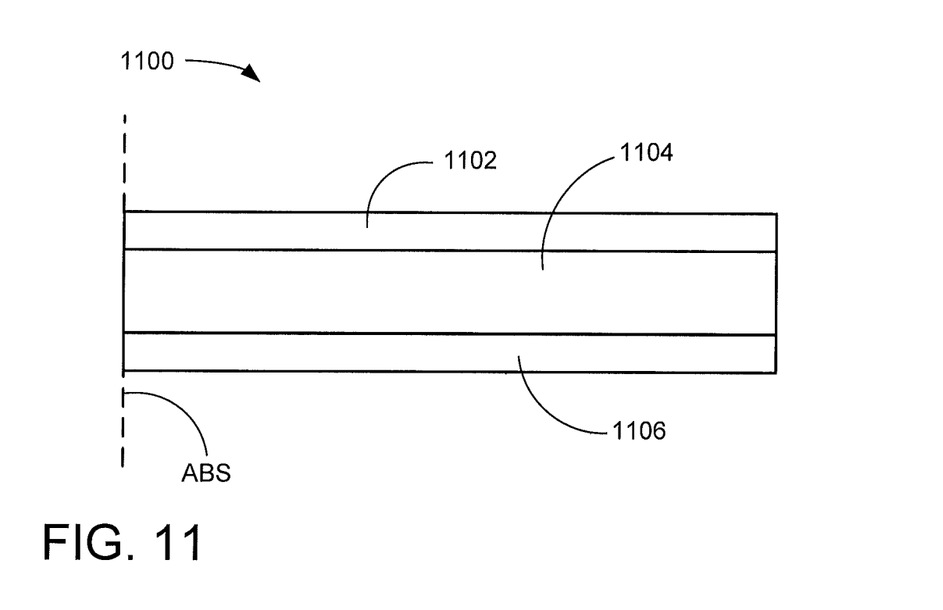
FIG. 11 provides a side view of an example MR stack, in accordance with various embodiments of the present disclosure.

FIG. 11 provides a side view of an example MR stack 1100 having a free layer 1102, non-magnetic layer 1104, and a pinned layer 1106. The non-magnetic layer 1104 separates the free layer 1102 and the pinned layer 1106. The free layer 1102 can include a ferromagnetic material that has a magnetization direction that is permitted to rotate in the magnetic field to which it is exposed. The pinned layer 1106 can include a ferromagnetic material that has an orientation that is fixed by a bias current. FIG. 11 only provides the basic layers of the MR stack 1100 and all spacing and insulating layers are omitted for clarity. In some embodiments, the free layer 1102 has a high resistance along the free layer 1102 in a direction perpendicular to the ABS and a low resistance parallel to the ABS, thereby allowing current channeling perpendicular to the ABS through certain areas of the MR stack 1100.

Figure 12:
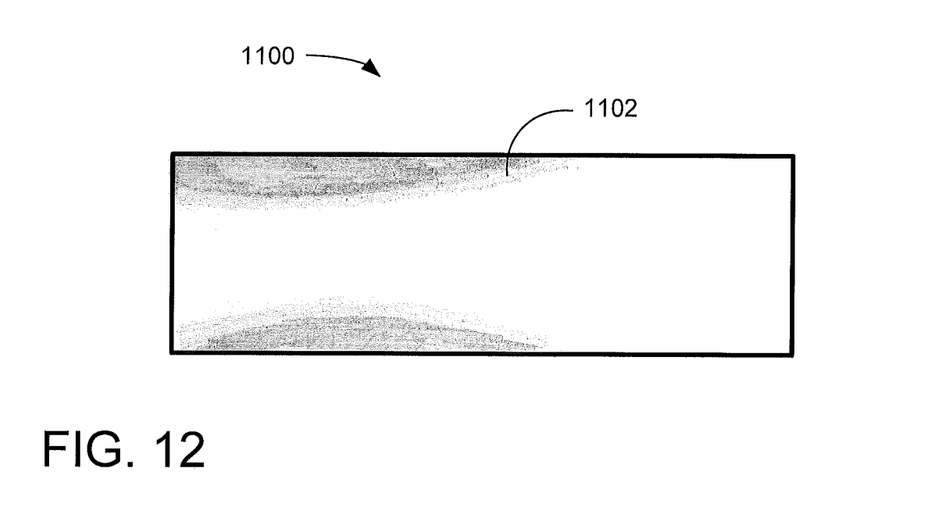
FIG. 12 provides a top view of the MR stack of FIG. 11.

FIG. 12 shows a top view of the MR stack 1100. The shaded regions of the MR stack 1100 represent positive and/or negative asymmetry. This unbalanced asymmetry in combination with electrode positioning along an MR stack, as shown in FIGS. 13-15, can be used to compensate for design and manufacturing issues.

Figure 13:
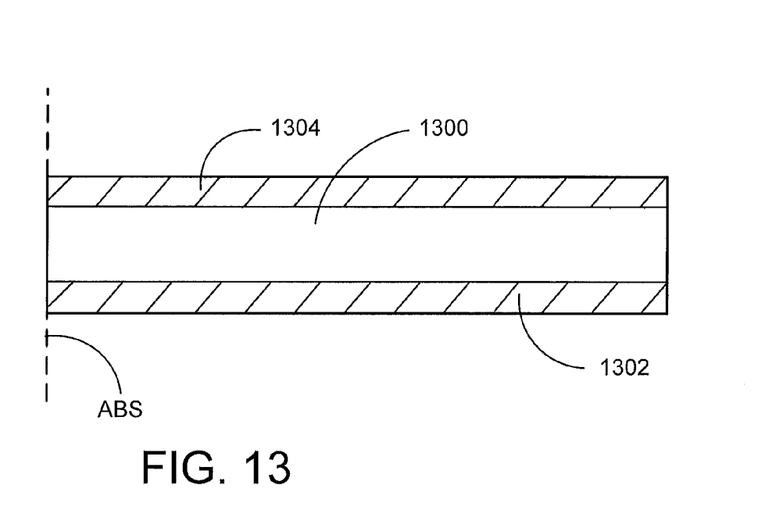
FIG. 13 provides a top view of a portion of an example magnetic reader, in accordance with various embodiments of the present disclosure.
Figure 14:
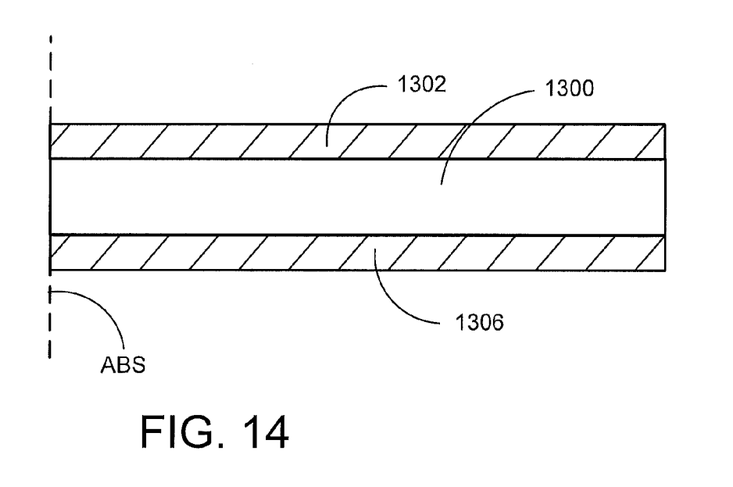
FIG. 14 provides a side view of the portion of the magnetic reader of FIG. 13.
Figure 15:
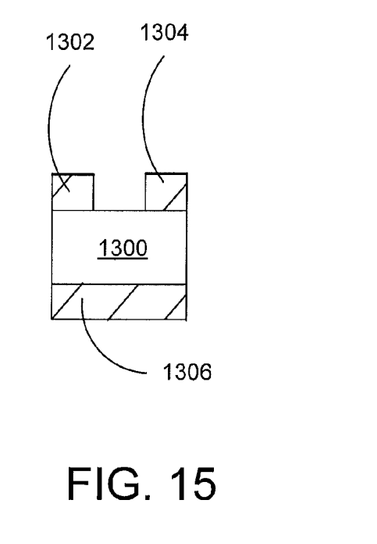
FIG. 15 provides a side view of the portion of the magnetic reader of FIG. 14.

FIGS. 13-15 show an MR stack 1300, first electrode 1302, second electrode 1304, and third electrode 1306. The first and second electrodes 1302 and 1304 are positioned at a first side of the MR stack 1300 and the third electrode 1306 is positioned at a second side of the MR stack 1300 opposite the first side.

FIGS. 13-15 provide the basic layers of the configuration; for example, the first, second, and third electrodes 1302, 1304, and 1306 are not necessarily connected directly to the MR stack 1300 because spacing and insulating layers may be positioned between the electrodes 1302-1306 and MR stack 1300.

The electrodes 1302-1306 are positioned to control current traveling through the MR stack 1300. For example, the electrodes 1302 and 1304 can be positioned directly above areas of the MR stack 1300 with negative or positive asymmetry. The positioning allows current channeling through desired areas of the MR stack 1300. Each electrode's length or stripe height can vary depending on the specific application.

Figure 16:
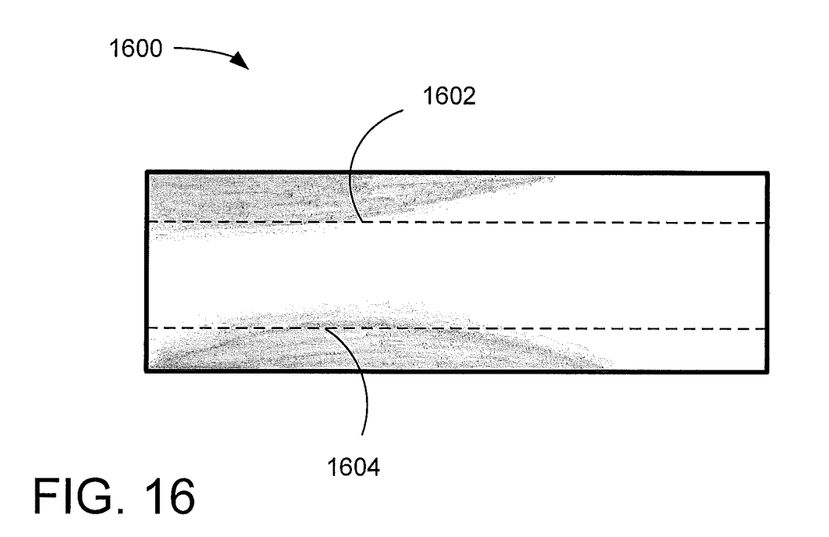
FIG. 16 provides a top view of an example MR stack, in accordance with various embodiments of the present disclosure.

FIG. 16 provides a top view of an MR stack 1600 with first and second electrodes 1602 and 1604 represented by dotted lines. The shaded regions of the MR stack 1600 represent positive and/or negative asymmetry. This unbalanced asymmetry in combination with electrode positioning along an MR stack, as shown in FIGS. 13-15, can be used to compensate for design and manufacturing issues.

Figure 17:
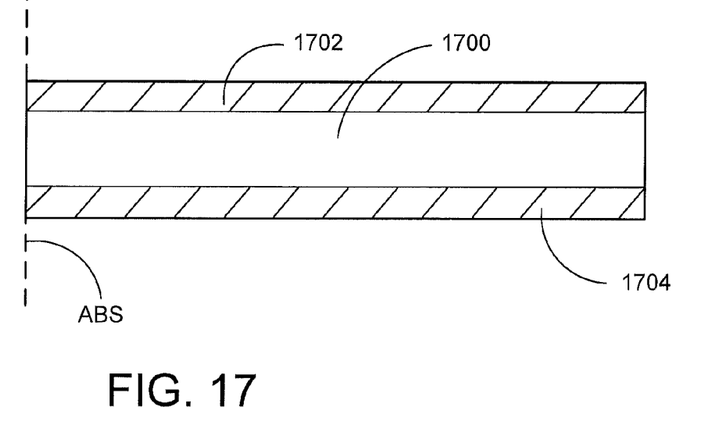
FIG. 17 provides a top view of a portion of an example magnetic reader, in accordance with various embodiments of the present disclosure.
Figures 18, 19:
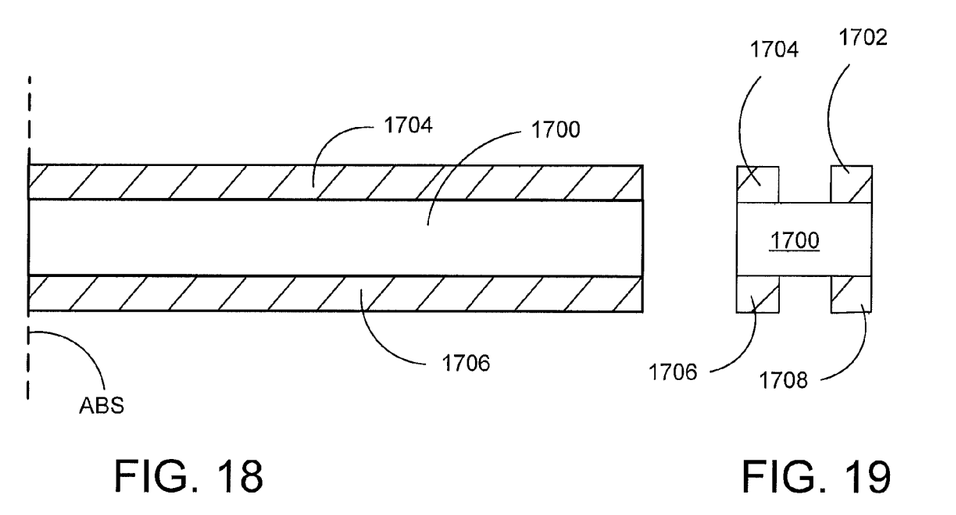
FIG. 18 provides a side view of the portion of the magnetic reader of FIG. 17.
FIG. 19 provides a side view of the portion of the magnetic reader of FIG. 18.

FIGS. 17-19 show an MR stack 1700, first electrode 1702, second electrode 1704, third electrode 1706, and fourth electrode 1708. The first and second electrodes 1702 and 1704 are positioned at a first side of the MR stack 1700 and the third electrode 1706 and fourth electrode 1708 are positioned at a second side of the MR stack 1700 opposite the first side. As shown in FIG. 19, the first and second electrodes 1702 and 1704 are spaced from each other, as are the third and fourth electrodes 1706 and 1708.

FIGS. 17-19 provide the basic layers of the configuration; for example, the first, second, third, and fourth electrodes 1702, 1704, 1706, and 1708 are not necessarily connected directly to the MR stack 1700 because various layers may be positioned between the electrodes 1702-1708 and MR stack 1700. The electrodes 1702-1708 are positioned to control current traveling through the MR stack 1700 and each electrode's stripe height can vary depending on the specific application.

Figure 20:
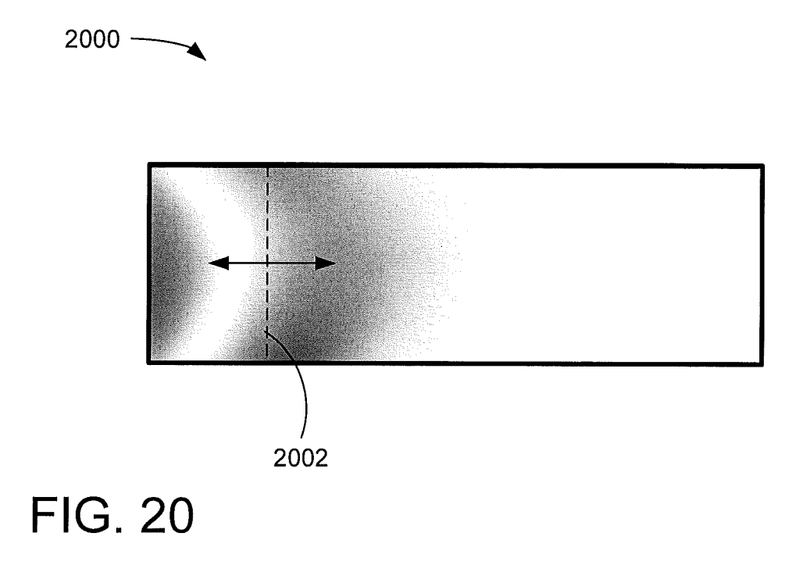
FIG. 20 provides a top view of an example MR stack, in accordance with various embodiment of the present disclosure.

FIG. 20 provides a top view of an MR stack 2000 with an electrode 2002 represented by dotted lines. The electrode 2002 length can vary, which is represented by the arrows. The longer the length of the electrode 2002 is the more negative the overall asymmetry of the MR stack 2000 will be. In this embodiment, only two electrodes are used and the first electrode 2002 length or the length of both electrodes is varied to balance the MR stack 2000.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A device comprising:
a magnetoresistive (MR) sensor having areas of positive or negative asymmetry; and
first and second electrodes coupled to the MR sensor and positioned at a first side of the MR sensor, wherein the first and second electrodes are spaced apart from each other and are positioned over an area of the MR sensor that has a positive or negative asymmetry such that the MR sensor's asymmetry becomes more balanced.

2. The device of claim 1, wherein the first and second electrodes are spaced apart from each other in a direction perpendicular to an air-bearing surface.

3. The device of claim 1, wherein both the first and second electrodes are positioned over areas of the MR sensor that have positive or negative asymmetry.

4. The device of claim 3, further comprising a third electrode coupled to the MR sensor and positioned at a second side of the MR sensor opposite the first side.

5. The device of claim 4, further comprising a fourth electrode positioned at the second side of the MR sensor.

6. The device of claim 4, wherein a width of the first electrode is less than a width of the third electrode.

7. A device comprising:
a magnetoresistive (MR) sensor;
first and second electrodes coupled to the MR sensor and positioned at a first side of the MR sensor, the first and second electrodes are spaced apart from each other; and
a third electrode coupled to the MR sensor and positioned at a second side of the MR sensor opposite the first side, wherein a combined stripe height of the first and second electrodes is less than a stripe height of the third electrode.

8. The device of claim 7, wherein the first, second, and third electrodes are directly connected to the MR sensor.

9. The device of claim 7, wherein the MR sensor is a trilayer reader.

10. The device of claim 9, wherein the trilayer reader includes two free layers and a non-magnetic layer positioned there between.

11. The device of claim 7, wherein the MR sensor includes a free layer, a non-magnetic layer, and a pinned layer.

12. The device of claim 7, wherein a stripe height of the first and second electrode is different.

13. The device of claim 7, wherein the first and second electrodes are positioned over areas of the MR sensor that have positive or negative asymmetry.

14. The device of claim 7, wherein the first and second electrodes unevenly channel current through the MR sensor.

15. The device of claim 7, wherein the MR sensor has an unbalanced asymmetry.

16. The device of claim 7, wherein the first and second electrodes are both positioned along a plane perpendicular to an air-bearing surface.

17. The device of claim 7, wherein the first electrode extends back from an air-bearing surface.

18. The device of claim 7, wherein the first and third electrodes extend back from an air-bearing surface.

19. A device comprising:
a magnetoresistive (MR) sensor having asymmetry that varies along the MR sensor; and
means for balancing asymmetry in the MR sensor.

* * * * *